United States Patent [19]

Colson et al.

[11] Patent Number: 5,600,138
[45] Date of Patent: Feb. 4, 1997

[54] REMOTE SENSING OF MODULATED SOURCES BY UNDERSAMPLED METHODS

[75] Inventors: Kenneth K. Colson, Dallas; Bryan S. Reese, Mesquite, both of Tex.

[73] Assignee: Texas Instruments Incorporated, Dallas, Tex.

[21] Appl. No.: 483,400

[22] Filed: Jun. 7, 1995

Related U.S. Application Data

[63] Continuation of Ser. No. 249,110, May 25, 1994, abandoned.

[51] Int. Cl.$^6$ ............................................. H04N 5/33
[52] U.S. Cl. ........................ 250/330; 250/332; 364/484
[58] Field of Search ................................. 250/330, 332; 364/484; 324/76.21

[56] References Cited

U.S. PATENT DOCUMENTS

5,099,194  3/1992  Sanderson et al. .................. 364/484
5,099,243  3/1992  Tsui et al. ........................... 364/484

*Primary Examiner*—Carolyn E. Fields
*Attorney, Agent, or Firm*—René E. Grossman; Richard L. Donaldson

[57] ABSTRACT

With a controlled scanning device (5, 6, 7), such as a FLIR, the scene which provides a modulated source is scanned with the scanning frequency being changed. This results in scanning of the scene with two different known scanning frequencies. By knowing the change in sampling frequency and correlating the changes in the Fourier frequency results in a spectrum analyzer (13), the frequency of the modulated source, including a source modulated at frequencies higher than the sampling rate of the sensor, is remotely measured.

19 Claims, 8 Drawing Sheets

REMOTE SENSING OF MODULATED SOURCES BY UNDERSAMPLED METHODS

This application is a continuation application of prior application Ser. No. 08/249,110, filed May 25, 1994, which is now abandoned.

BACKGROUND OF THE INVENTION

1. Field of the Invention

This invention relates to detection and identification of modulation of unknown sources which are at higher frequencies than half of the sampling frequency of the detecting device and which cannot be remotely identified.

2. Brief Description of the Prior Art

It is often useful to examine modulated signals, such as, for example, optical (such as visible or infrared (IR)) energy. Collection of modulated IR data has, in the past, required specialized sensor hardware which can sample at a high rate to ensure that data does not become aliased. Aliasing results from sampling data at an insufficiently fast rate so that it appears at incorrect frequencies. The bandwidth that can be viewed unaliased is half the sample rate or the Nyquist rate. Aliased frequencies are higher frequencies that fold back into the lower frequency area which is half the Nyquist or sampling rate. Aliasing results in ambiguity in determining the actual frequency of the data collected. The frame rates of, for example, standard imaging optical receivers are too low (30 to 60 Hz) to ensure that modulated data from many sources of interest remain unaliased. Scanner limitations make it very difficult to increase forward looking infrared (FLIR) frame rates above 60 Hz. Accordingly, prior art solutions to the problem of aliasing required a unique sensor, independent of the scanning sensor.

SUMMARY OF THE INVENTION

In accordance with the present invention, the above noted problems of the prior art are overcome and there is provided a relatively simple system which is capable of providing accurate estimates of the original modulation frequencies from aliased data.

Briefly, there is provided a sampling system, preferably a modified FLIR system or other optical system capable of sampling at two slightly different rates. With a controlled sampling or scanning device of this type, the scanning frequency is changed where scanning is used, thereby resulting in a change in sampling frequency. By knowing the change in sampling frequency and correlating the changes in the Fourier frequency results, the frequency of the modulated source, including those modulated at frequencies higher than the sampling rate of the sensor may be measured. For example, if the sensor scanning is at a frame rate of 60 Hz, the typical fold-over frequency would be 30 Hz. Only sources with modulation below 30 Hz could be sampled without alias (i.e., the fourier transform of a signal at 40 Hz sampled at 60 Hz would appear as a 20 Hz signal). If the sampling frequency is changed, the apparent frequency following a fourier transform would have a corresponding change. If the same 40 Hz signal was sampled at 66 Hz, the apparent frequency would be 26 Hz. A signal with a modulation frequency of 20 Hz would be unchanged, appearing as 20 Hz for both sampling frequencies.

A relationship between the original frequency content of the aliased data has been derived using data collected at two different sampling frequencies ($F_{sample\ 1}$ and $F_{sample\ 2}$). The resulting equation 1 for the general case is as follows:

$$F_{original} = (F_{alias\ 1}^2 - F_{alias\ 2}^2 + (n_{f2} * F_{sample\ 2})^2 - (n_{f1} * F_{sample\ 1})^2) / 2(n_{f2} * F_{sample\ 2} - n_{f1} * F_{sample\ 1}) \quad \text{(equation 1)}$$

where:

$F_{original}$=the original unaliased frequency.
$F_{sample\ 1}$=sample frequency 1.
$F_{sample\ 2}$=sample frequency 2.
$F_{alias\ 1}$=the aliased frequency of data collected using sample frequency 1.
$F_{alias\ 2}$=the aliased frequency of data collected using sample frequency 2.
$n_{f1}$=the number of times the aliased frequency was folded about the Nyquist frequency using sample frequency 1.
$n_{f2}$=the number of times the aliased frequency was folded about the Nyquist frequency using sample frequency 2.

It follows from the above equation 1 that, in order to reconstruct the original frequency given aliased frequencies $F_{alias\ 1}$ and $F_{alias\ 2}$, it is necessary to know $F_{sample\ 1}$, $F_{sample\ 2}$, $n_{f1}$ and $n_{f2}$. The aliased frequencies can be determined by performing a Fast Fourier Transform (FFT) of the data. The sampling frequencies are known selectable system parameters. Determining the number of folds, $n_f$, is the difficult problem and to determine $n_f$ uses data sampled at two different rates.

DESCRIPTION OF THE PREFERRED EMBODIMENTS

Figure 1:
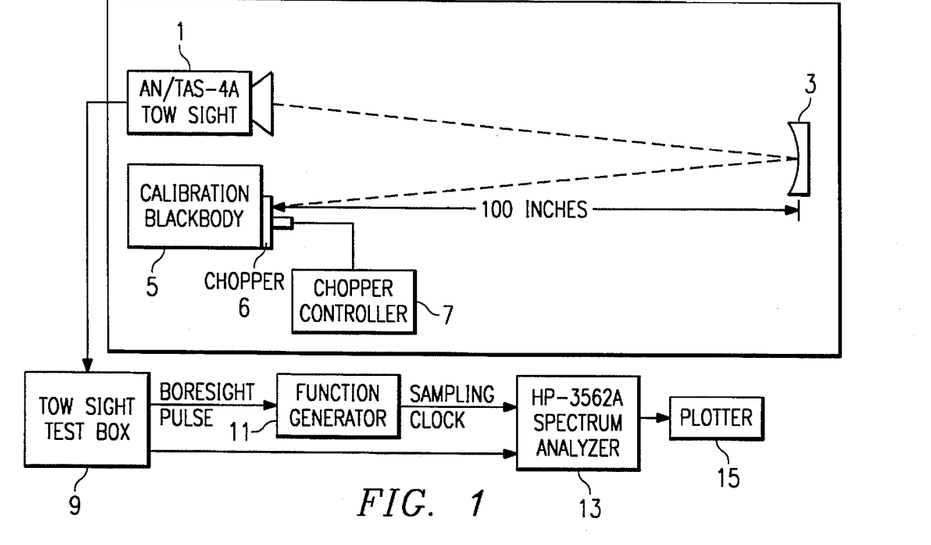
FIG. 1 is an instrumentation arrangement which can be used for detecting and identifying an unknown source in accordance with a first embodiment of the invention.

Referring first to FIG. 1, there is shown a first instrumentation arrangement for identifying the unknown source. An AN/TAS-4A TOW night sight receiver 1, which is a standard FLIR receiver, is placed on an optical bench and aligned to look through a 100 inch focal length collimating mirror 3 at a chopped blackbody source 5 which simulates the unknown source. The chopper 6 controlled by chopper controller 7 was equipped with an accurate frequency controller. The chopped blackbody source 5 and mirror 3 are used to simulate the scene in this embodiment. In actual practice, the mirror 3 and blackbody 5 would be replaced by the scene providing the unknown source to be detected and identified. The blackbody aperture was aligned with the center of boresight of the FLIR receiver 1. A sufficient emissivity differential existed between the chopper blades and the blackbody that it was not necessary to power the blackbody to receive a detectable signal. The output cable from the receiver 1 was connected to a TOW sight test box 9 in the form of an AN/TAM-5 postamp test set. The test box 9 only provides access to selected channels and the boresight pulse. Nothing else in the test box 9 is applicable to this problem. From the circuit 9 it was possible to obtain the boresight pulse signal and access to the output of individual receiver detector channels. The boresight pulse is a signal which indicates when the scanner is at the center of horizontal scan.

A HP-3562A spectrum analyzer 13 was used to sample the data and perform a Fast Fourier Transform (FFT) on the data received to obtain the frequency content of the data. In practice, the HP-3562A spectrum analyzer 13 would be replaced by other computing or calculating devices which perform an equivalent function. The analyzer 13 was arranged to be driven by an external sample clock signal generated by a function generator 11 synchronized with the boresight pulse. The purpose of the function generator 11 is to feed the timing and control for the FLIR 1 to change the frame rate. This ties the sample rate to the scanning rate of the FLIR 1. The scan rate of the FLIR 1 was changed for different samples as is noted hereinbelow. The boresight pulse occurs twice per video frame, making the sample rate of the spectrum analyzer 13 twice the frame rate of the receiver 1. The blackbody aperture was large enough so that the target was visible on the center channel on both the forward and the interlaced reverse scan of the receiver 1. After performing an FFT of the data received from the box 9 in the analyzer 13, the output of the analyzer, which was the frequency content of the data, was plotted by plotter 15 using a pen plotter.

The test data was collected using two different FLIR sample rates for each chopper frequency. The frame rate of the receiver 1 drifts over time. The different sample rates were obtained by waiting until the frame drifted sufficiently. Table 1 indicates the chopper frequencies used during the test and the associated sample rates.

TABLE 1

Sample Frequencies and Source Frequencies for Receiver Test

| Data Set # | Sample Frequency (Hz) | Chopper Frequency (Hz) |
|---|---|---|
| 1 | 68.0 | 44.5 |
|   | 67.5 |  |
| 2 | 67.5 | 22.5 |
|   | 68.0 |  |
| 3 | 68.0 | 67.0 |
|   | 68.25 |  |
| 4 | 68.0 | 8.08 |
|   | 68.3 |  |
| 5 | 67.5 | 60.0 |
|   | 67.9 |  |

Figure 2:
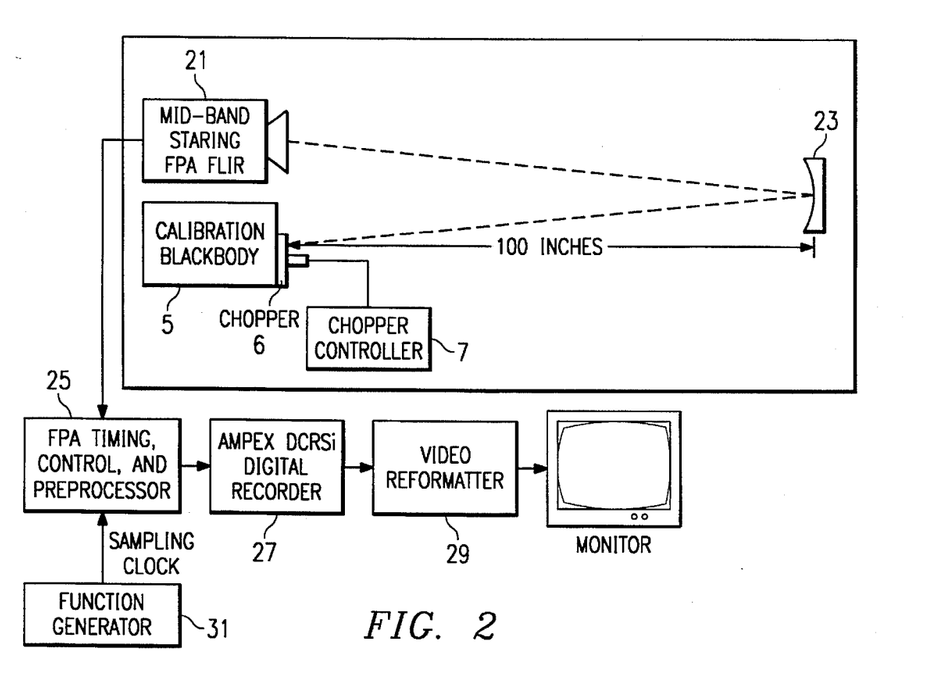
FIG. 2 is an instrumentation arrangement which can be used for detecting and identifying an unknown source in accordance with a second embodiment of the invention.

Referring now to FIG. 2, there is shown a second arrangement for identifying an unknown source. In this case, there is provided a staring focal plane array (FPA) forward looking infrared (FLIR) 21 utilizing a 256×256 InSb detector array manufactured by Amber Engineering. The FPA FLIR 21 was aligned through a 100 inch focal length collimating mirror 23 to the same chopped blackbody source 5 and chopped controller 7 as used in conjunction with the embodiment of FIG. 1. The chopped blackbody source 5 and mirror 23 are used to simulate the scene in this embodiment. In actual practice, the mirror 23 and blackbody 5 would be replaced by the scene providing the unknown source to be detected and identified. The FPA FLIR timing, control and preprocessor circuitry 25 is very similar to prior art video preprocessors except that it can accept an external clock which determines the sample rate. Circuitry 25 is driven by a function generator 31 which provides two different sampling clock signals to the circuitry 25, the circuit 25 allowing any clock speed to be input to the FLIR 21. The frame rate of the FLIR 21 is derived from a clock in circuitry 25. The system thereby provides enormous flexibility in the selection of tightly controlled system frame rates. The sampled data from the FPA was stored on an AMPEX digital recorder 27. During the data collection, RS-170 FLIR video was generated by a reformatter 29 from the data recorded in recorder 27 to permit monitoring of the test on a monitor 31. The reformatter was designed to generate RS-170 video regardless of the input frame rate of the data. The data was analyzed by uploading the recorded digital data to a computer with FFT processing tools available. The chopper frequencies used for the test and the associated data sample rates are provided in Table 2. The added flexibility of the FPA FLIR in choosing sample rates allowed more than two sample rates to be used for the same chopper frequency.

TABLE 2

Sample Frequencies and Source Frequencies for the FPA Test

| Data Set # | Sample Frequency (Hz) | Chopper Frequency (Hz) |
|---|---|---|
| 1 | 59.0 | 60.0 |
|   | 61.0 |  |
|   | 62.0 |  |
|   | 64.0 |  |
| 2 | 59.0 | 30.0 |
|   | 61.0 |  |
|   | 62.0 |  |
|   | 64.0 |  |
| 3 | 62.0 | 25.0 |
|   | 64.0 |  |

The data from each of the embodiments as set forth in TABLE 1 and TABLE 2 was analyzed using an FFT. The Fourier transforms of data collected at a single chopper frequency at two different sample rates was compared.

The HP-3562A spectrum analyzer 13 was used to sample and perform the FFTs on the center detector channel output of the receiver 1. In this embodiment, the spectrum analyzer 13 provided a 2048 point FFT and only 800 of the 1024 points below the fold frequency were displayed. There was no ability to reduce the length of the transform or see the data up to the fold frequency. The result was that very long time records were taken at the receiver 67–68 Hz sample rate (time records were 30+seconds long). Also, signals at frequencies between 26 Hz and 42 Hz and multiples thereof could not be seen. The long time records provided very good frequency resolution (1.30=0.033 Hz) but it would not be practical in many applications to collect data for such a long time period. The chopper frequencies has to be chosen to ensure that most harmonics would be visible. Despite these limitations, the data was sufficient to illustrate the principle.

Frequency domain plots of the data collected with the receiver 1 while looking at the chopped blackbody 5,7 are shown in FIGS. 3 to 7. The plots were generated using the spectrum analyzer 13 and correspond to data sets 1, 2, 3, 4 and 5 of TABLE 1 respectively.

Figure 3:
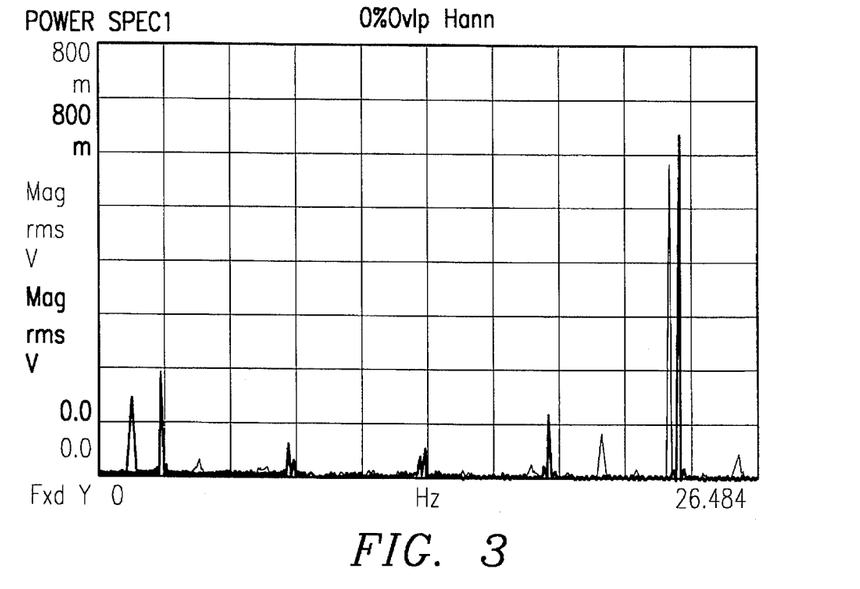
FIG. 3 is a plot of two sets of data corresponding to the dark line and the thin line of the plot.

FIG. 3 represents plots of two sets of data, corresponding to the dark line and the thin line of the plot. Both sets of data are of a 50% duty cycle chopped blackbody running at 44.5 Hz. The data represented by the dark line was collected using a sample rate of 68 Hz and the thin line used a sample rate of 67.5 Hz. Since the chopper fundamental frequency was greater than half the sample rate, aliasing did occur. The aliased frequency at which an under-sampled signal can be expected can be calculated using the following algorithm: Let:

$F_{signal1}$=the original signal frequency.

$F_{sample}$=the sample frequency.

$F_{alias}$=the final aliased frequency of the signal.

$n_f=0$ $F_{alias}=F_{signal}$ while $F_{alias}>F_{sample}/2$ $F_{alias}=|F_{signal}-F_{sample}|$ $n_f=n_f+1$ The above algorithm predicts that the aliased frequency of the 44.5 Hz signal sampled at 68 Hz should be 23.5 Hz and for a sample frequency of 67.5 Hz the aliased frequency should be 23.0 Hz. This is verified in FIG. 3. The number of times the above algorithm must be looped through to obtain the aliased frequency is defined as the number of alias folds, $n_f$. Predicting where the fundamental frequency in the case of FIG. 3 would alias required only one fold but predicting aliased harmonic locations can require multiple folds. It follows from the above discussion that, in order to reconstruct the original frequency given an aliased frequency, $F_{alias}$, it is also necessary to know $F_{sample}$ and $n_f$. The sample frequency, $F_{sample}$, will generally be known and $F_{alias}$ can be found from the FFT. However the number of alias folds, $n_f$, cannot be determined from data collected at a single sample rate.

When collecting data of a periodic signal at two different frame rates, the separation between the aliased frequency components of the two data sets can be shown, in special cases, to be equal to the number of folds times the difference between the sample rates. This is summarized in the following equation:

$$F_{alias}=n_f*\Delta F_{sample} \text{ or } n_f=\Delta F_{alias}/\Delta F_{sample} \quad \text{(equation 2)}$$

The special case for which the relationship of the above equation 2 applies is when the original frequency does not fall between the two sample frequencies or multiples of the sample frequencies. For this special case, the aliased frequencies will have folded the same number of times ($n_{f1}=n_{f2}$ in equation 1 and$=n_f$ from equation 2). An underlying assumption required to use equation 2 is that the individual frequency components of the signal can be differentiated based upon amplitude. This permits pairing of the correct frequency components when comparing two data sets sampled at different rates. For the cases that the above relationship is not applicable, the frequencies will fall across fold boundaries and will often fold a different number of times, invalidating the relationship. All of the data collected in the example of the first embodiment falls into the category where the relationship is applicable and $n_f$ can be determined using the above equation 2. For the data collected in conjunction with this embodiment, determining the original frequencies is simply a matter of matching the frequency components collected at one sample rate with the components collected at the other sample rate and applying the above equation 2 to determine $n_f$. In FIG. 3, for example, the largest amplitude frequency components are located at 23 Hz and 23.5 Hz. The difference between these frequency components, $\Delta F_{alias}$, is 0.5 Hz. This is equal to the difference in the sample rates $\Delta F_{sample}$. This means that $n_f=1$. Substituting into equation 1 yields a predicted fundamental frequency that matches the actual fundamental frequency of 44.5 Hz. The difference between the next highest amplitude harmonics in FIG. 3 located at 2.5 Hz (68 Hz sample frequency) and 1.5 Hz (67.5 Hz sample frequency) is twice $F_{sample}$ or 1.0 Hz, yielding $n_f=2$. Substituting into equation 1 yields a predicted frequency of 133.5 Hz. As expected for a square wave, this is the third harmonic or three times the fundamental frequency.

Figure 4:
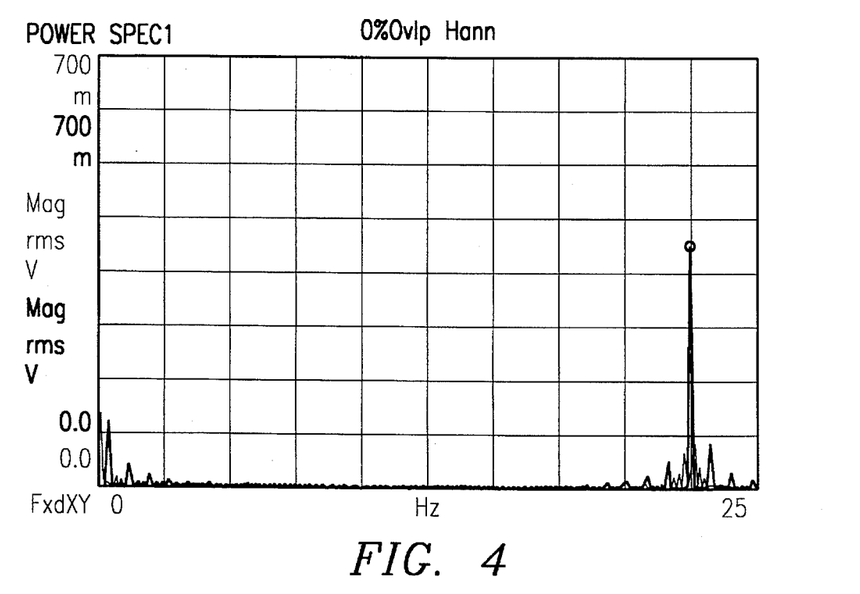
FIG. 4 is an example of an unaliased data signal fundamental.
Figure 5:
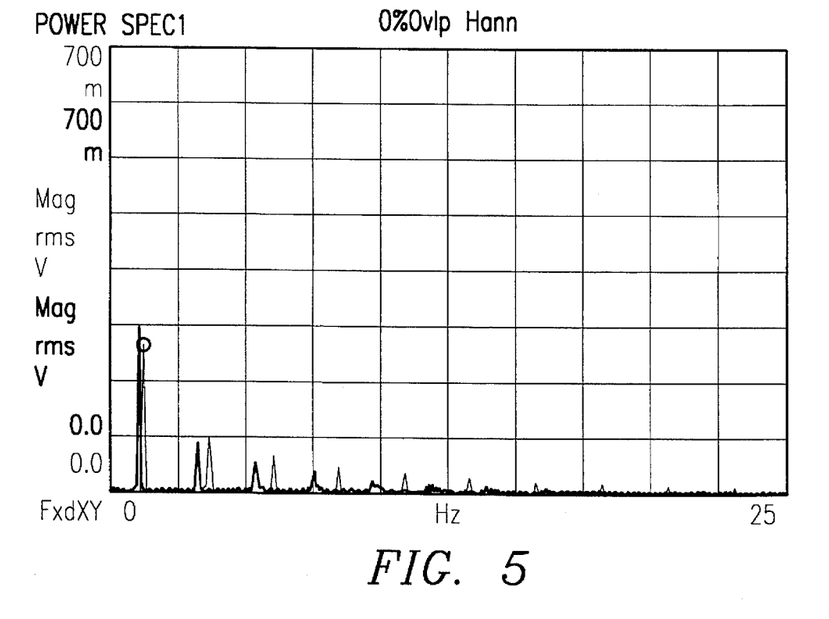
FIG. 5 shows the aliased spectrum for a signal close to the sample rate of the FLIR 1.
Figure 6:
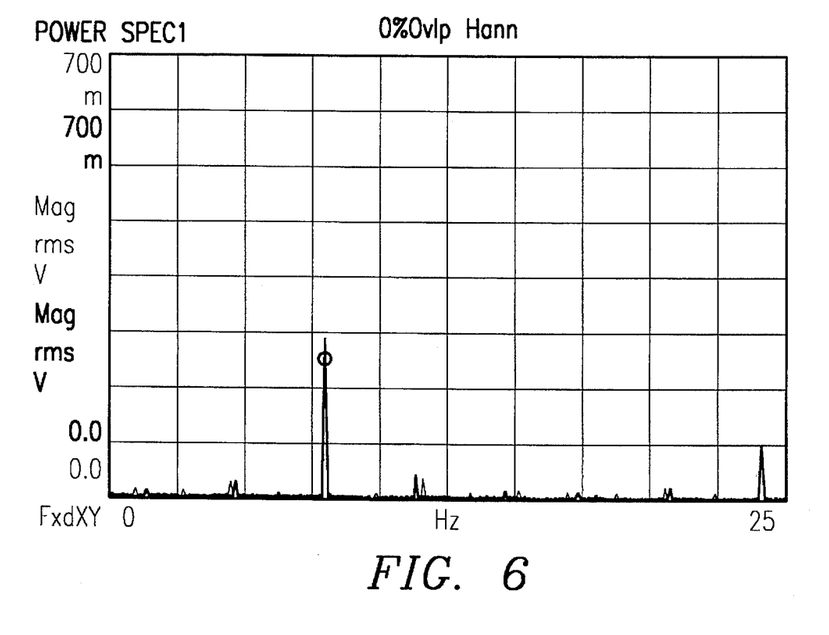
FIG. 6 is an example of an unaliased fundamental frequency and third harmonic.
Figure 7:
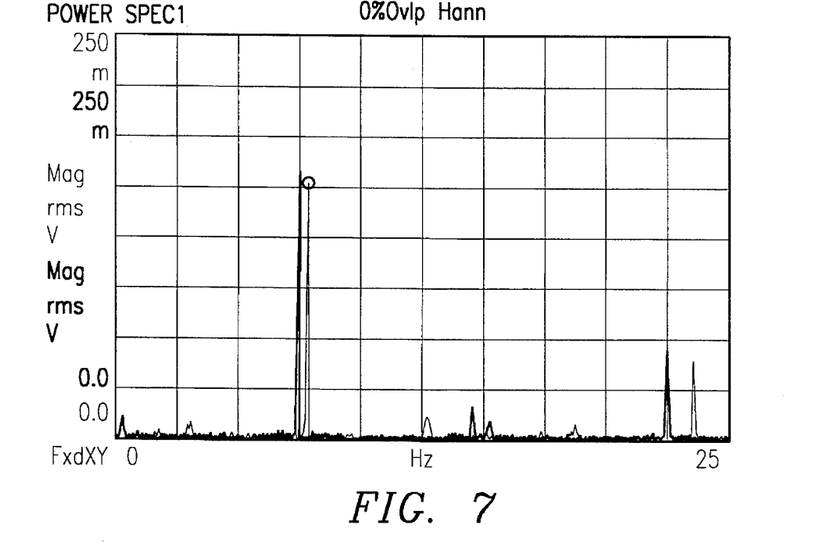
FIG. 7 is an example of the spectrum of a 60 Hz when sampled by the FLIR 1.

FIG. 4 is an example of what the data would look like for an unaliased signal fundamental frequency. The 22.5 Hz signal in FIG. 4 does not change with the different sample rates. FIG. 5 shows the aliased spectrum for a signal close to the sample rate of receiver 1. FIG. 6 is an example where the fundamental frequency and the third harmonic are unaliased. FIG. 7 is an example of the spectrum of a 60 Hz signal when sampled by the FLIR receiver of FIG. 1.

The circuit of FIG. 2 did not suffer from the same limitations as the circuit of FIG. 1 because it involved a digital FLIR with full digital control of the sample rates. The flexibility of the digital system allows processing of more reasonable time records (2 to 4 seconds instead of 30 seconds) and allowed the generation of cases where reconstruction of the original frequency from the aliased ones is more challenging. Prior to performing the FFT of the data collected by the staring FPA 21, the mean of the time record was subtracted to eliminate the large DC component.

Figure 8:
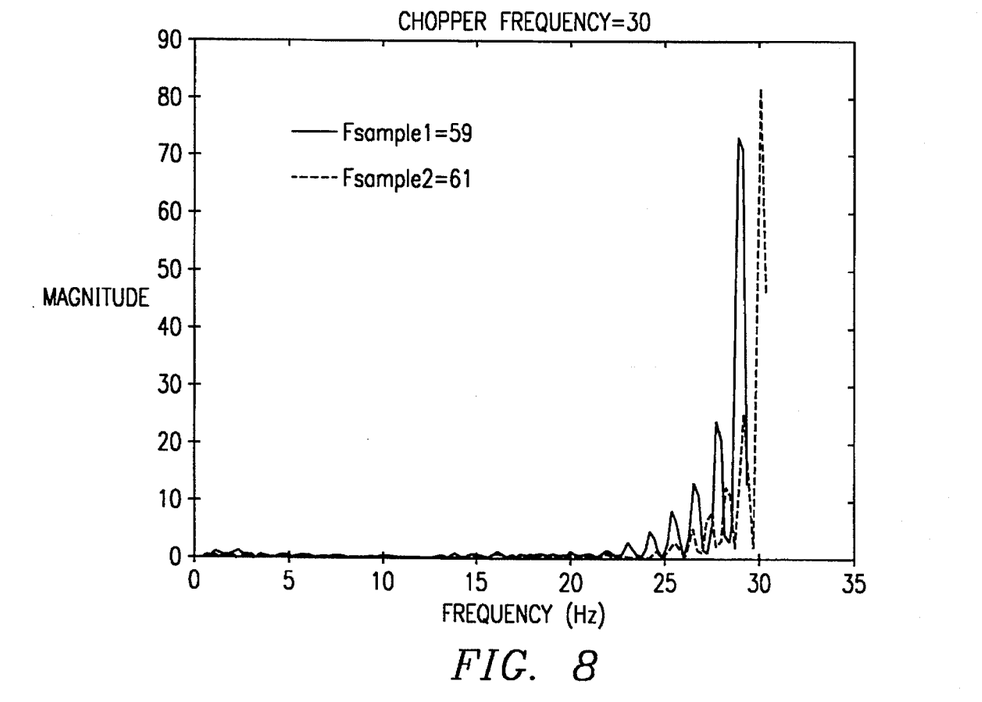
FIG. 8 is a graph of the spectrum of chopper data from a single staring FPA pixel at 59 Hz and 61 Hz sample frequencies with a chopper frequency of 30 Hz.
Figure 9:
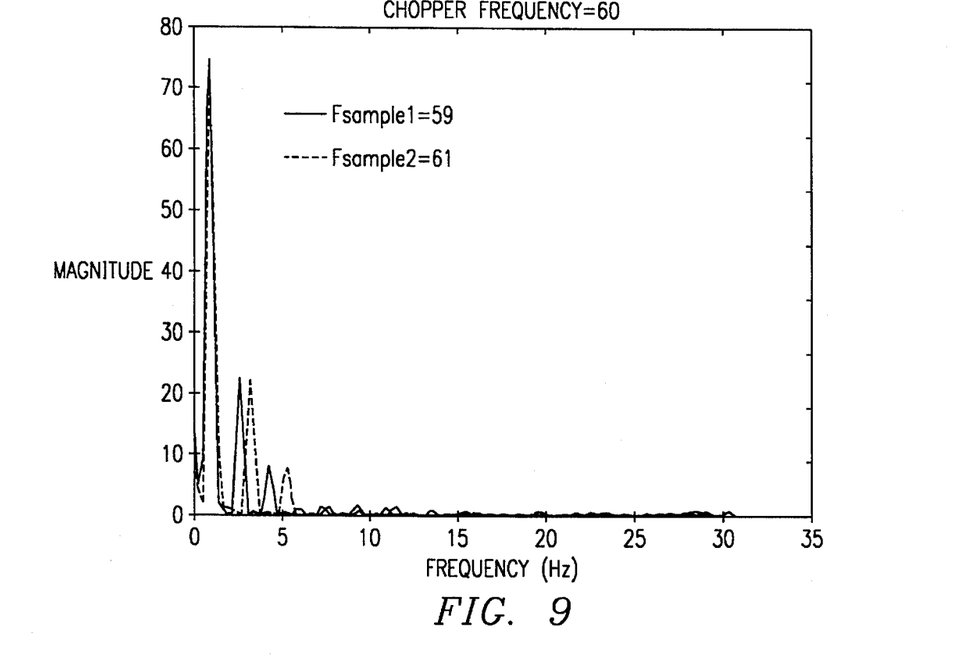
FIG. 9 is a graph of the spectrum of chopper data from a single staring FPA pixel at 59 Hz and 61 Hz sample frequencies with a chopper frequency of 60 Hz.

Plots of the resulting test cases are shown in FIGS. 8 to 14. FIGS. 8 and 9 are examples of situations where determining the original frequency with data collected at two sample rates is more difficult because the original frequency of a multiple thereof is at a frequency between the two sample frequencies. FIG. 8 is a case where the chopper frequency is at 30 Hz and the sample rates are at 59 Hz and 61 Hz. The result is that the 30 Hz signal is aliased to 29 Hz with the 59 Hz sample rate and is unaliased with the 61 Hz sample rate. The number of times the data is folded back is different for the different sample rates so equation 2 cannot be used to determine $n_f$. The difference between the two aliased frequencies is half the difference between the sample rates. It may be possible to develop an alternative approach using a continuously varying sample rate to track between two selected sample rate extremes. This would permit tracking of the aliased frequency so that it is known what path the component moved on between the extremes. The difference between the aliased extremes could then be correctly determined even when fold boundaries are crossed. Collecting a third time record with a third sample rate providing data compatible with equation 2 is another alternative.

The test case shown in FIG. 9 yields complete ambiguity. The chopper frequency was at 60 Hz, precisely half way between the two sample frequencies of 59 Hz and 61 Hz. In this case, all harmonics fold back to the same frequencies for both sample rates. the plot shows a slight difference in the higher harmonics, but this is a result of the chopper frequency drifting slightly. A third sample rate would be required to reconstruct the original frequencies in this case. the number of occurrences of situations similar to those shown in FIGS. 8 and 9 can be minimized with some a priori knowledge about the frequencies expected from the data. The sample rates can be placed slightly higher than the maximum expected fundamental to ensure that it does not fall between the sample frequencies. The sample frequency difference, $F_{sample}$, should also be maintained as small as possible without eliminating the ability to resolve the differences between frequency locations.

Figure 10:
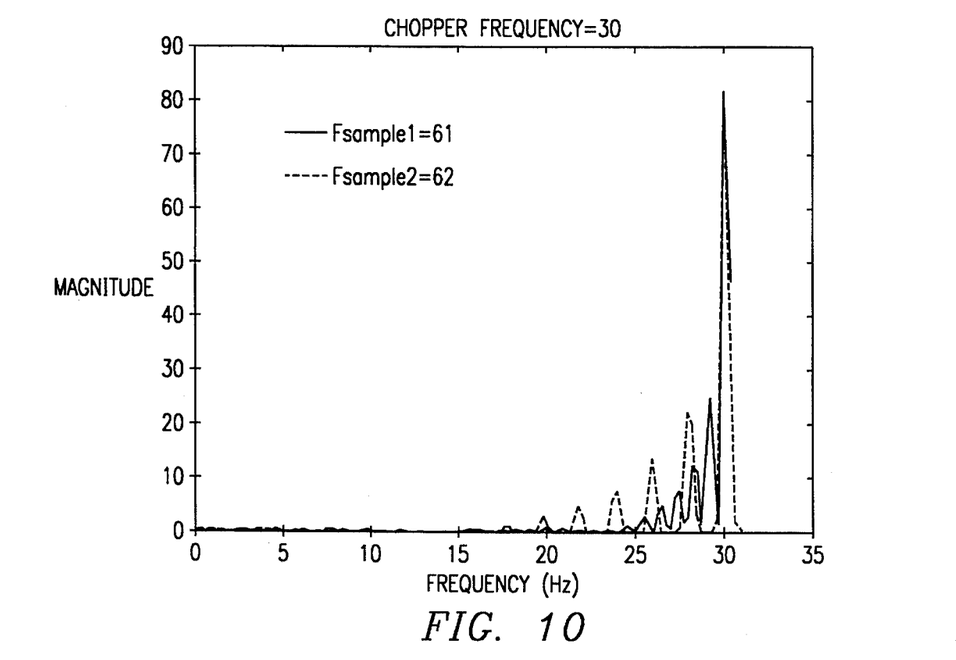
FIG. 10 is a graph of the spectrum of chopper data from a single staring FPA pixel at 61 Hz and 62 Hz sample frequencies with a chopper frequency of 30 Hz.

The data of FIG. 10 was for the chopper running at the same frequency as that of FIG. 8 (30 Hz) but instead of sampling at 59 Hz and 61 Hz sampling was performed at 61 Hz and 62 Hz. This prevented the problem experienced with FIG. 8, allowing equations 1 and 2 to be used for correct frequency reconstruction.

Figure 11:
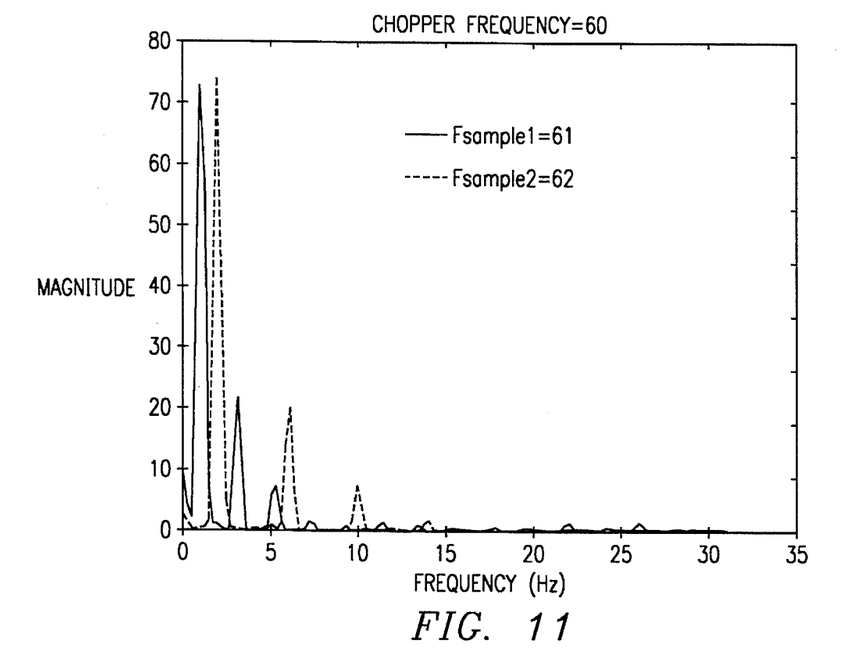
FIG. 11 is a graph of the spectrum of chopper data from a single staring FPA pixel at 61 Hz and 62 Hz sample frequencies with a chopper frequency of 60 Hz.

FIG. 11 was the same chopper frequency as FIG. 9 but with 61 Hz and 62 Hz sample frequencies. Equations 1 and 2 can be used to correctly reconstruct the frequency components.

Figure 12:
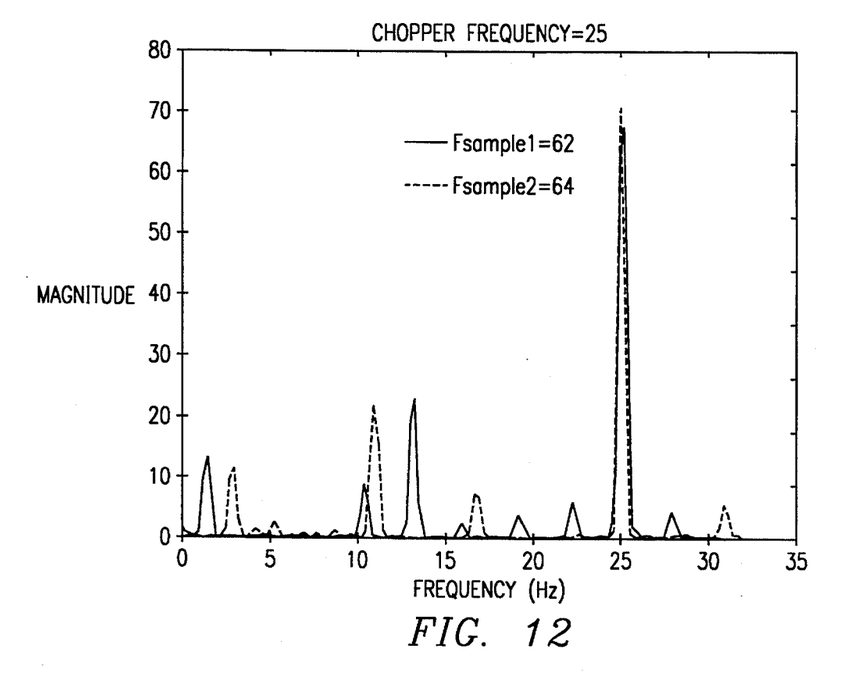
FIG. 12 is a graph of the spectrum of chopper data from a single staring FPA pixel at 62 Hz and 64 Hz sample frequencies with a chopper frequency of 25 Hz.

FIG. 12 resulted from a chopper running at 25 Hz with the sample rate at 62 Hz and 64 Hz. Equation 2 accurately predicts $n_f$ for all but the fifth harmonic which falls across the DC (0 Hz) fold boundary. The original frequency is at 125 Hz and aliases to 1 Hz with the 62 Hz sample rate and 3 Hz with the 64 Hz sample rate. The 3 Hz component is actually negative, but it is not possible to distinguish negative and positive frequencies. Equation 2 incorrectly calculates one fold instead of 2. Substituting into equation 1 results in an original frequency estimate of 61 Hz. A continuously varying sample rate would permit tracking across this boundary and permit correct calculation of $n_f$.

Figure 13:
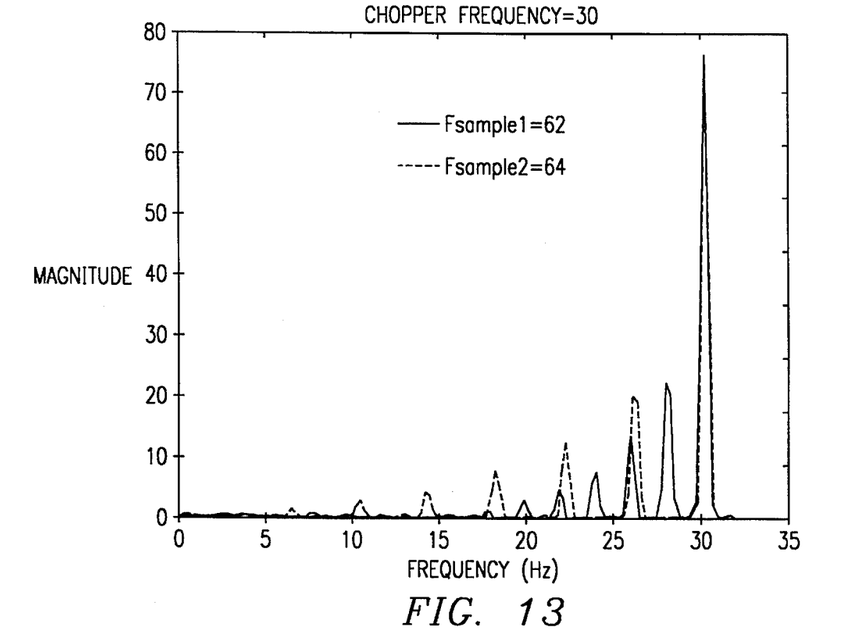
FIG. 13 is a graph of the spectrum of chopper data from a single staring FPA pixel at 62 Hz and 64 Hz sample frequencies with a chopper frequency of 30 Hz.
Figure 14:
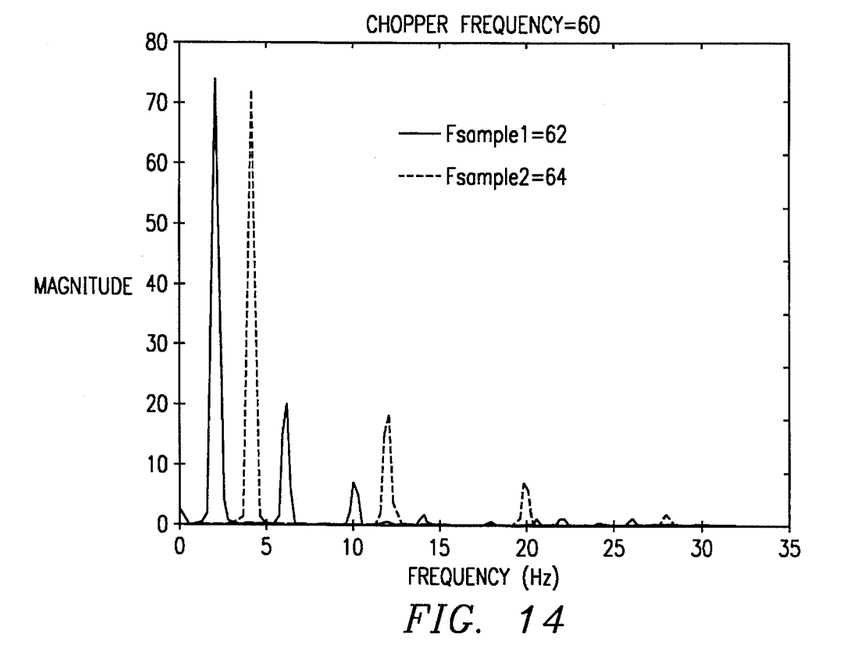
FIG. 14 is a graph of the spectrum of chopper data from a single staring FPA pixel at 62 Hz and 64 Hz sample frequencies with a chopper frequency of 60 Hz.

FIGS. 13 and 14 show the spectra resulting from a chopper running at 30 Hz and 60 Hz respectively with sampling frequencies of 62 Hz and 64 Hz. Equations 1 and 2 correctly reconstruct all major frequency components.

Figure 15:
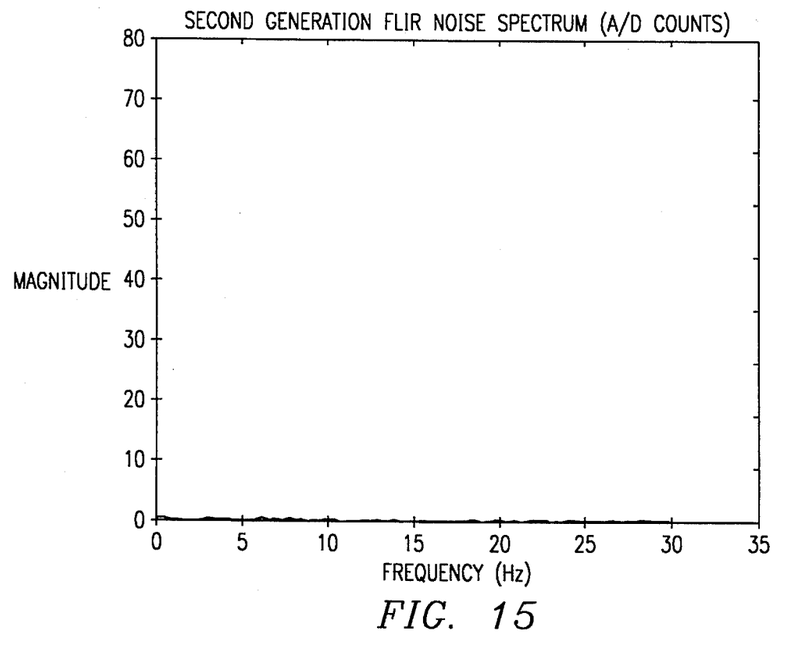
FIG. 15 is a graph of the noise spectrum from a second generation FLIR shown with similar scale as the chopper data.
Figure 16:
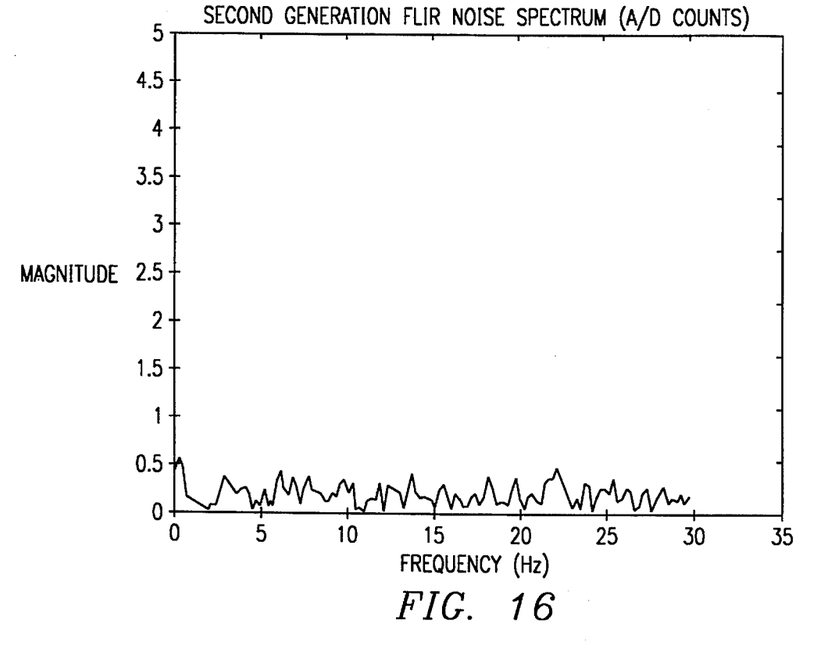
FIG. 16 is a graph of the noise spectra of a second generation scanning FLIR scaled up to see the noise structure.

To ensure that the time-delay and integrate (TDI) process used extensively in scanning FPA system would not introduce coherent noise in the frequency spectrum, data from numerous detector elements was collected from a scanning FPA FLIR system while it was viewing a typical DC scene (sky, foliage, ground cover). The FLIR system used has a SOFRADIR 288×4 FPA detector. The FLIR has a 60 Hz frame rate with a unidirectional scan. The data shown in FIGS. 15 and 16 is typical. FIG. 15 shows the noise spectrum in A/D count magnitude versus frequency with approximately the same scale as the staring FPA data discussed previously. FIG. 16 is a zoomed view of the same data to better show the noise structure. It is apparent that no corrupting noise frequency components are present in the data. It can reasonably be assumed that a scanning FPA FLIR can be used to collect modulated IR data with minimal noise interference.

It is apparent that a scanning FLIR and a staring FPA FLIR are both capable of collecting modulated IR data sampled at the FLIR frame rate. Frequency components greater than half the frame rate will be aliased. The original frequency components of modulated data, aliased by under sampling, can often be reconstructed if sampled at two slightly different frequency rates, but sometimes cannot. The key to accomplishing a reconstruction is determining the number of folds experienced by an aliased frequency. The number of folds and, hence, the original frequency, cannot be determined using two discrete sample rates when sampled using the second rate. Crossing of the fold boundary occurs when the original frequency is located between the two sampling frequencies or a multiple of the sampling frequencies.

A more robust method of reconstructing the original frequencies is contemplated which would require either the use of three different sample rates or the use of a continuously varying sample rate. Use of three different sample rates will ensure that the original signal frequency is not between at least two of the sample frequencies. The following algorithm can be used for data sampled at three different rates (modification of equation 2):

$n_{f1-2} = \Delta f_{a1-2}/\Delta f_{s1-2}$
$n_{f2-3} = \Delta f_{a2-3}/\Delta f_{s2-3}$
If $n_{f1-2} \geq n_{f2-3}$, then
  $n_{f1} = n_{f1-2}$
  $n_{f2} = n_{f1-2}$
Execute equation 1.
else
  $n_{f1} = n_{f2-3}$
  $n_{f2} = n_{f2-3}$
  $f_{sample1} = f_{sample2}$
  $f_{sample2} = f_{sample3}$
  $f_{alias1} = f_{alias2}$
  $f_{alias2} = f_{alias3}$
Execute equation 1.

Use of a continuously varying sample rate permits tracking of the aliased frequency during sample frequency slewing to determine whether a fold boundary is crossed.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A method of detecting and identifying an unknown source providing modulation frequencies comprising the steps of:

(a) sampling the unknown source at a first known frequency to obtain first sampled data indicative of said unknown source;

(b) sampling the unknown source at a second known frequency different from said first known frequency to obtain second sampled data indicative of said unknown source;

(c) identifying the modulation frequencies of said unknown source from said first sampled data and said second sampled data;

(d) wherein said first known frequency and said second known frequency are lower than at least some of the modulation frequencies of said unknown source; and (e) providing a FLIR capable of sampling at at least two different frequencies for sampling said unknown source at said first and second known frequencies.

2. The method of claim 1 further including the step of providing a Fast Fourier Transform of each of said first and second sampled data add wherein step (c) comprises the step of identifying the modulation frequencies of said unknown source from said Fast Fourier Transforms of said first and second sampled data.

3. A method of detecting and identifying an unknown source providing modulation frequencies comprising the steps of:
   (a) sampling the unknown source at a first known frequency to obtain first sampled data indicative of said unknown source;
   (b) sampling the unknown source at a second known frequency different from said first known frequency to obtain second sampled data indicative of said unknown source; and
   (c) identifying the modulation frequencies of said unknown source from said first sampled data and said second sampled data;
   wherein said step of identifying includes the step of calculating the formula:

$$F_{original} = (F_{alias\ 1}^2 - F_{alias\ 2}^2 + (n_{f2} * F_{sample\ 2})^2 - (n_{f1} * F_{sample\ 1})^2) / 2(n_{f2} * F_{sample\ 2} - n_{f1} * F_{sample\ 1}) \quad [\text{(equation 1)}]$$

where:

$F_{original}$ = the original unaliased frequency.

$F_{sample\ 1}$ = sample frequency 1.

$F_{sample\ 2}$ = sample frequency 2.

$F_{alias\ 1}$ = the aliased frequency of data collected using sample frequency 1.

$F_{alias\ 2}$ = the aliased frequency of data collected using sample frequency 2.

$n_{f1}$ = the number of times the aliased frequency was folded about the nyquist frequency using sample frequency 1.

$n_{f2}$ = the number of times the aliased frequency was folded about the nyquist frequency using sample frequency 2.

4. The method of claim 3 further including the step of calculating $n_f$ by the formula $n_f = F_{alias}/F_{sample}$.

5. The method of claim 3, further including the step of providing a FLIR capable of sampling at at least two different frequencies for sampling said unknown source at said first and second known frequencies.

6. The method of claim 5 further including the step of calculating $n_f$ by the formula $n_f = F_{alias}/F_{sample}$.

7. The method of claim 5 further including the step of providing a Fast Fourier Transform of each of said first and second sampled data and wherein step (c) comprises the step of identifying the modulation frequencies of said unknown source from said Fast Fourier Transforms of said first and second sampled data.

8. The method of claim 7 further including the step of calculating $n_f$ by the formula $n_f = F_{alias}/F_{sample}$.

9. The method of claim 7 wherein said first known frequency and said second known frequency are lower than at least some of said modulation frequencies.

10. The method of claim 5 wherein said first known frequency and said second known frequency are lower than at least some of said modulation frequencies.

11. The method of claim 3 further including the step of providing a Fast Fourier Transform of each of said first and second sampled data and wherein step (c) comprises the step of identifying the modulation frequencies of said unknown source from said Fast Fourier Transforms of said first and second sampled data.

12. The method of claim 11 further including the step of calculating $n_f$ by the formula $n_f = F_{alias}/F_{sample}$.

13. The method of claim 11 wherein said first known frequency and said second known frequency are lower than at least some of said modulation frequencies.

14. The method of claim 3 wherein at least some of the modulation frequencies of said unknown source are higher said first and second known frequencies.

15. The method of claim 14 further including the step of calculating $n_f$ by the formula $n_f = F_{alias}/F_{sample}$.

16. The method of claim 3 further including the step of providing a Fast Fourier Transform of each of said first and second sampled data and wherein step (c) comprises the step of identifying the modulation frequencies of said unknown source from said Fast Fourier Transforms of said first and second sampled data.

17. The method of claim 16 wherein said first known frequency and said second known frequency are lower than at least some of said modulation frequencies.

18. The method of claim 3 wherein said first known frequency and said second known frequency are lower than at least some of said modulation frequencies.

19. A method of detecting and identifying an unknown source providing modulation frequencies comprising the steps of:
   (a) sampling the unknown source at a first known frequency to obtain first sampled data indicative of said unknown source;
   (b) sampling the unknown source at a second known frequency different from said first known frequency to obtain second sampled data indicative of said unknown source; and
   (c) identifying the modulation frequencies of said unknown source from said first sampled data and said second sampled data;
   (d) wherein said first known frequency and said second known frequency are lower than at least some of the modulation frequencies of said unknown source.

* * * * *